(12) United States Patent
Tanaka et al.

(10) Patent No.: US 8,521,622 B2
(45) Date of Patent: Aug. 27, 2013

(54) COMPUTER SYSTEM FOR MANAGING PART ORDER PLACEMENT

(75) Inventors: Hidenobu Tanaka, Tokyo (JP); Kazuma Kuno, Tokyo (JP); Satoshi Miwa, Tokyo (JP); Kenji Shirae, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 196 days.

(21) Appl. No.: 12/597,582

(22) PCT Filed: May 28, 2008

(86) PCT No.: PCT/JP2008/059846
§ 371 (c)(1),
(2), (4) Date: Oct. 26, 2009

(87) PCT Pub. No.: WO2008/146861
PCT Pub. Date: Dec. 4, 2008

(65) Prior Publication Data
US 2010/0121742 A1 May 13, 2010

(30) Foreign Application Priority Data
May 29, 2007 (JP) ................................. 2007-141914

(51) Int. Cl.
*G06F 17/50* (2006.01)
*G06Q 10/08* (2012.01)
(52) U.S. Cl.
CPC .................................. *G06Q 10/087* (2013.01)
USPC .................. 705/29; 700/83; 700/121; 705/34
(58) Field of Classification Search
CPC .................................................. G06Q 10/0875
USPC .............................. 705/29, 34; 700/83, 121
See application file for complete search history.

(56) References Cited

U.S. PATENT DOCUMENTS 5,841,659 A * 11/1998 Tanaka et al. ................. 700/121
6,226,561 B1 * 5/2001 Tamaki et al. ................ 700/100
(Continued)

FOREIGN PATENT DOCUMENTS

JP 63-200950 8/1988
JP 03-156504 7/1991
(Continued)

OTHER PUBLICATIONS

Japanese Office Action application No. 2007-141914 dated Oct. 26, 2010.

*Primary Examiner* — Ryan Zeender
*Assistant Examiner* — Hunter Wilder
(74) *Attorney, Agent, or Firm* — Squire Sanders (US) LLP

(57) ABSTRACT

A computer program is embodied on a non-transitory computer readable medium. The computer program manages order of parts according to a production plan. The computer program, when run on a computer, controls the computer to execute functions comprising developing a plurality of parts necessary to produce a product which comprises at least one of a first product model and a second product model, and required volume of each of the parts according to the product model. The program also controls the computer to compare parts which were developed and required volume of the parts for the first product model with the parts which were developed and required volume of the parts for the second product model. A difference is calculated between volume of the parts necessary for production of the first product model and volume of the parts necessary to produce the second product model concerning each of the parts for the first and the second product models according to an input of a production change from the first product model for which parts have been ordered to the second product model. The program then controls the computer to display the parts and volume of the parts necessary to produce the second product model in association with the difference on a display screen.

3 Claims, 3 Drawing Sheets

(56) References Cited

U.S. PATENT DOCUMENTS

| | | | |
|---|---|---|---|
| 7,117,050 B2 * | 10/2006 | Sasaki et al. | 700/83 |
| 2004/0243491 A1 * | 12/2004 | Hsiang | 705/34 |
| 2005/0177536 A1 * | 8/2005 | Iida et al. | 707/1 |

FOREIGN PATENT DOCUMENTS

| | | |
|---|---|---|
| JP | 09-319809 A | 12/1997 |
| JP | 2001-127401 A | 5/2001 |
| JP | 2002-041121 | 2/2002 |
| JP | 2002-092434 A | 3/2002 |
| JP | 2002-333915 | 11/2002 |
| JP | 2003-288110 | 10/2003 |
| JP | 2006-331262 | 12/2006 |
| JP | 2007-128225 A | 5/2007 |

* cited by examiner

COMPUTER SYSTEM FOR MANAGING PART ORDER PLACEMENT

BACKGROUND OF THE INVENTION

1. Field of the Invention

The present invention relates to a computer system for ordering parts necessary for production according to a production plan. The present invention especially relates to a computer system for rapidly processing, when a production plan requiring various parts is changed, order of parts according to the changed production plan such that the parts already ordered according to the production plan before the change are used in the changed production plan.

2. Description of the Related Art

In a system for ordering parts necessary for production according to a production plan, ordering parts is performed by a form of separation delivery that parts ordered at once are divisionally delivered on a plurality of delivery times in order to control the stock volume of the parts for production in the factory in a desirable range of volume. Time which is moved for delivery is called a lead time for delivery.

Japanese patent No. 3680264 discloses a system for ordering parts according to the progress of production. Japanese patent Application Laid-Open No. 2002-333915 discloses the ordering parts or the instructions for delivery is performed at different timing.

No matter how the order and the delivery are managed so as to control the stock volume by the manufacturer which uses the parts in a desirable range of volume as shown above, when a model for which parts has been already ordered is substantially changed to other model according to specification change or design change etc., it happens that parts for the other model need to be ordered immediately.

In this case, it needs work to control or dispose the parts already ordered for the previous model before the model change. It is efficient that common parts usable for new production in the parts already ordered are directly applied to the new production. However, in production for product such as automobile, which needs plenty of parts over one thousand to tens of thousands, it needs complicated and laborious work to specify common parts usable for the new production, confirm the quantity of the parts and set timing for order/delivery when ordering parts necessary for the new production.

SUMMARY OF THE INVENTION

An object of the present invention is to provide a computer system which assists transaction for rapidly specifying volume of parts necessary for a new production and ordering the parts, when the production model to be manufactured is changed, using common parts usable for both of productions before and after the model change.

According to an aspect of the invention, a computer system for managing order for parts according to a production plan is provided. The computer system is programmed to execute the functions comprising identifying a plurality of parts necessary for production of a product model and required volume of each of the parts according to the product model, comparing parts which were identified and required volume of the parts for a first model with parts which were identified and required volume of the parts for a second model, and calculating a difference between volume of the parts necessary for production of the first model and volume of the parts necessary for production of the second model concerning each of parts for the first and the second models responsive to input of production change from the first model for which parts have been ordered to the second model; and displaying the parts and the volume of the parts necessary for the production of the second model in association with the difference on a display screen.

According to an aspect of the invention, when the model of the product to be manufactured is changed, the arrangement of the common parts, the different parts and the required quantities of those for the product before and after the model change is rapidly performed, and the ordering parts for new product is also rapidly performed.

According to an aspect of the invention, the display screen includes fields for changeably displaying a planed delivery date, a delivery place and quantity of the part relating to part number of each of the parts.

The user can input modification to be required on the display screen and associate the product plan with delivery timing of the product or the delivery place of the product etc. since the fields relating to the common parts is displayed on the display screen.

According to an aspect of the invention, the display screen includes a field for displaying parts necessary for production of the first and the second models as a table including index of part number, a field for displaying quantity necessary for the production of the first model, a field for displaying the difference between quantities of the parts necessary for production of the first model and production of the second model and a field for displaying transaction status of the association.

As such, fields shown above are displayed on the screen, the user can rapidly and efficiently manage to order the parts since the user can see the difference (quantity) necessary for the additional order on the display screen and the status of the association transaction relating to the delivery place and the delivery timing etc.

According to an aspect of the invention, the display screen includes a mode selection button for switching mode between a mode for displaying only parts for which the difference exists and a mode for displaying all parts. Therefore, the user can rapidly order the parts since the parts needed to be additionally ordered is only displayed on the display screen.

DETAILED DESCRIPTION OF THE INVENTION

Figure 1:
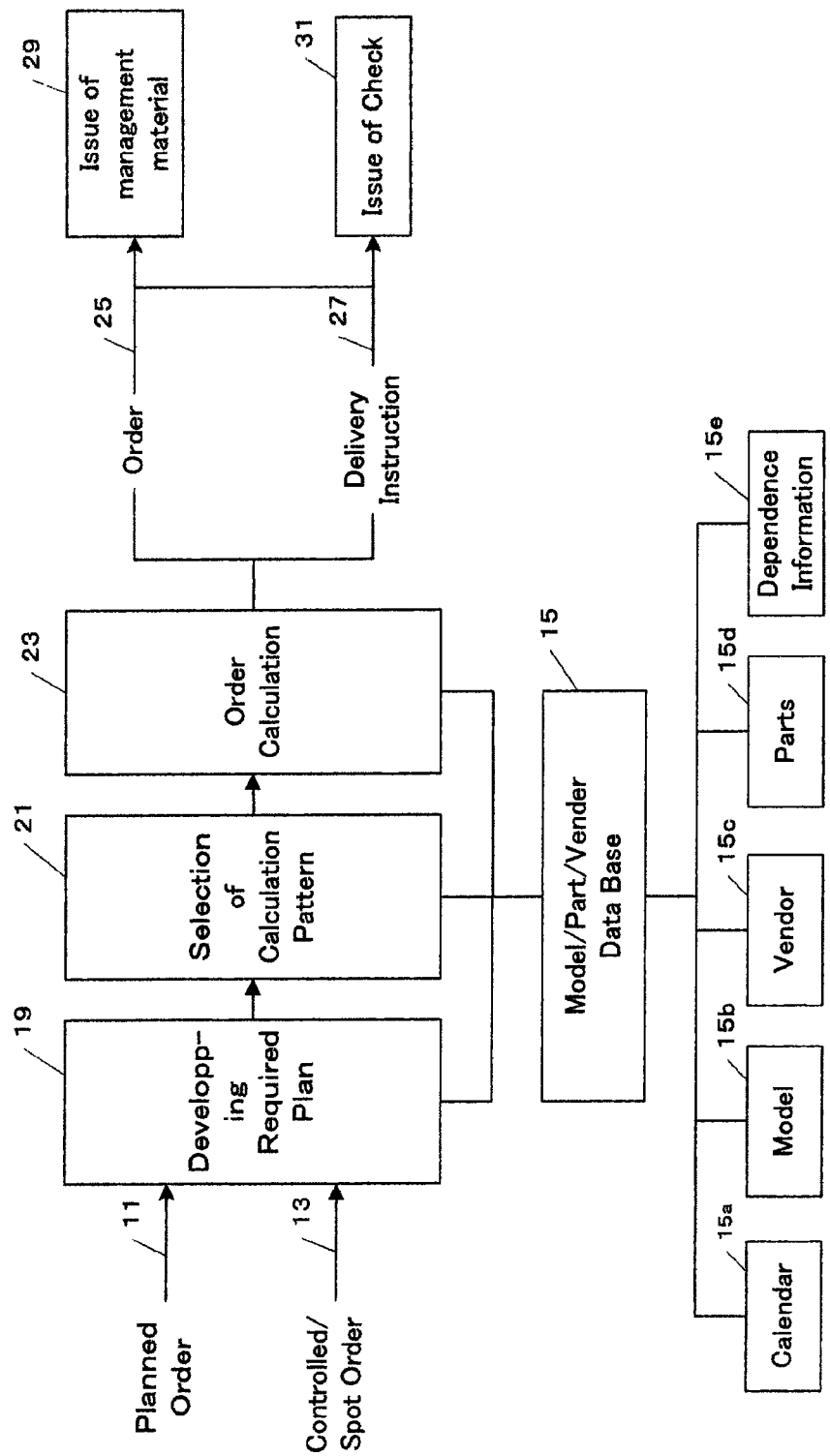
FIG. 1 is a block diagram illustrating an entire configuration of a system for managing to order parts according to an embodiment of the invention.

An exemplary embodiment of the invention will be described below with reference to the drawings. FIG. 1 is a block diagram illustrating an entire configuration of a system for managing to order parts according to an embodiment of the invention. The computer system includes a host computer and a plurality of client computers connected to the host computer via an internal network. The user can access to the host computer via the client computer and order parts by reading data stored in the host computer or inputting data in the host computer.

The host computer includes a processor (CPU), RAM which provides work space to the processor and an external storage device to store large data such as HDD. Not only a personal computer for general use but also a computer which has a restricted function to use as a terminal is used as the host computer. The client computer includes a processor (CPU), RAM, a computer program (software), a non-volatile storage to store data, a key board, an input device like a mouse, a display device to display data and so on.

Referring to FIG. 1, the system for managing to order parts has two execution formations. One is a formation which responds to data 11 for a planned order sent from the computer system to manage the production plan for products. The other is a formation which responds to data 13 for an unexpected order such as a spot order or a controlled order etc. The invention relates to the latter formation to manage order for parts.

The controlled order means order to apply any adjustment to the order which has been already ordered. For example, there is a formation to change model B to model A on condition that order of parts necessary to manufacture the model B which needs a predetermined quantity has been already ordered.

Figure 2:
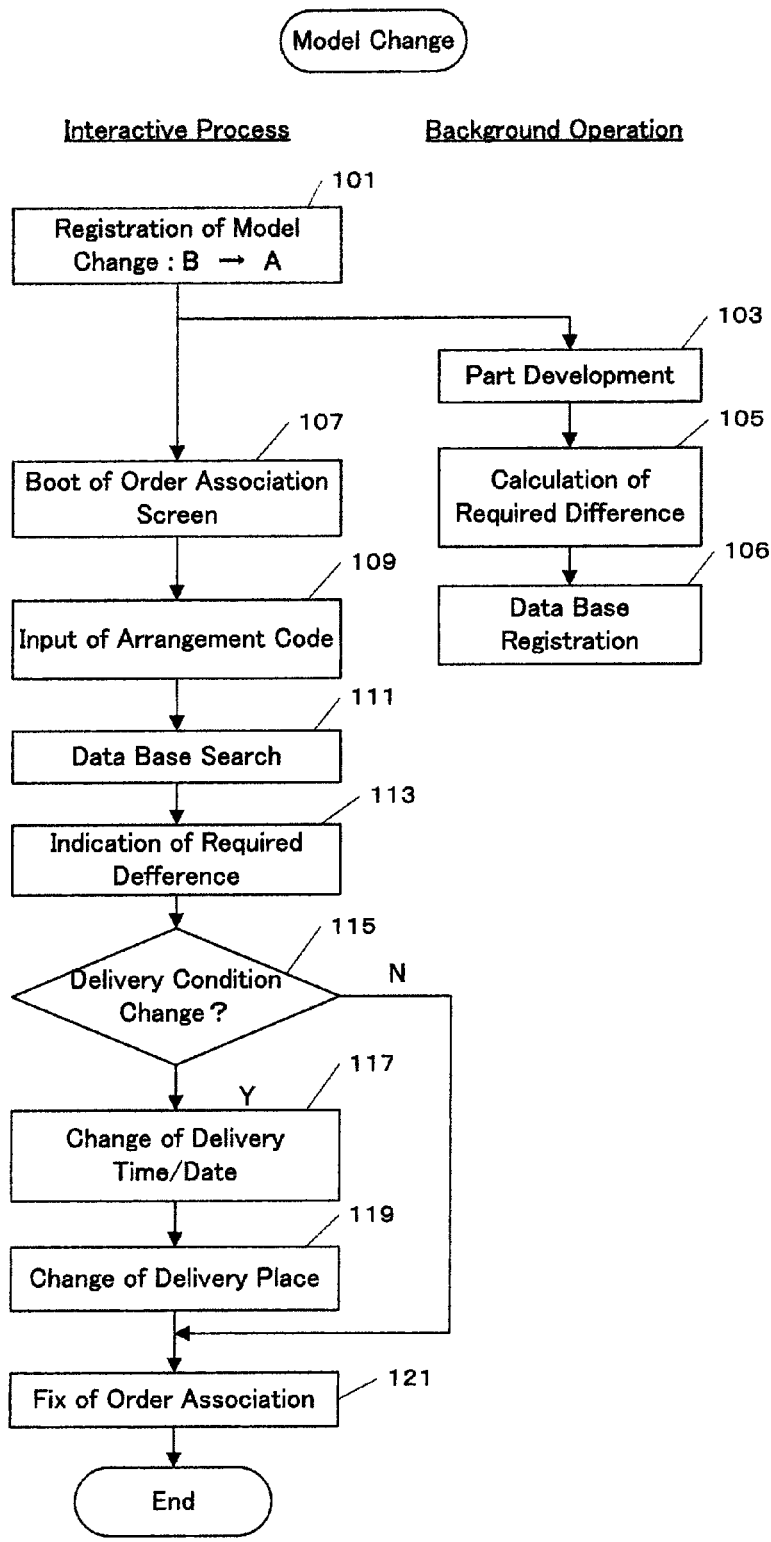
FIG. 2 illustrates a flow chart to show a process for controlling order of parts according to the model change.

Referring to the flow chart in FIG. 2, an exemplary embodiment of the invention is described. First it is registered in a system (not illustrated) for managing product plan that the model B which has been already planned to manufacture is changed to the model A. After data for the model change is inputted (registered) into the system for managing to order parts (101), the function for identifying required volume 19 breaks down the new model B into parts referring to a data base and calculates required volume of the parts (103).

The function for selecting calculation patterns 21 has a plurality of calculation patterns for long term order, weekly order, delivery instructions, calculating the difference for controlled order and so on according to the formation of the order. In the embodiment, the calculation pattern for calculating the difference of quantity for controlled order is selected. The function 23 for calculating orders performs calculation for order according to the calculation pattern selected by the function 21. In the embodiment, the difference between quantity of the parts already ordered for the model B and quantity of the parts necessary for the new model A is calculated in the step 105 in FIG. 2. As shown in top of FIG. 2, the host computer executes the calculation as background operation and registers the result of the calculation in the data base (106).

The host computer has a relational data base 15. The data base 15 stores a calendar 15 for schedule management, a table 15b for watching models, a vendor table 15c including information of vendors to deliver parts, a part table 15d including data of parts related to models and a table 15e including dependence information related to the part table 15d.

The parts table 15d includes, for example, the following fields and constitutes a record every part number.

1) Part number
2) Part name
3) Code of related model 1
4) Number of use for model 1
5) Code of related model 2
6) Number of use for model 2
7) Vendor code
8) Link address to table of dependence information The field for code and the field for number of use are provided according to every model if there is a plurality of relating models. If there is a plurality of vendors relating to one part, fields corresponding to number of vendors are provided.

The fields of the vendor code in the part table 15d is related to the field of the vendor code in the vendor table 15c. The user can grasp the parts necessary for the model and the required volume (quantity) of the parts by searching the part table 15d using the model code.

Figure 3:
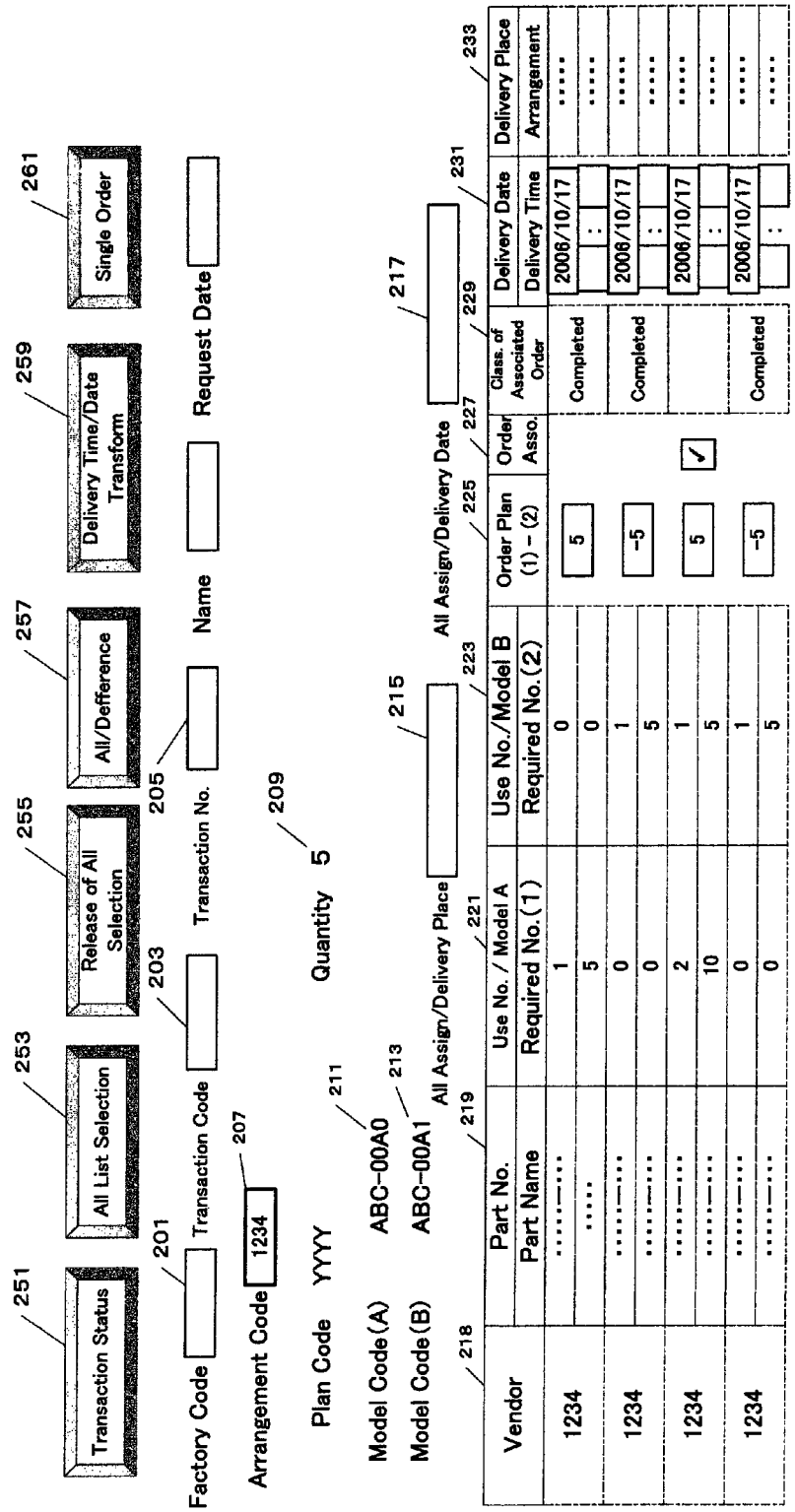
FIG. 3 illustrates an example of screen image displayed on the display screen of the system according to an embodiment of the invention.

The user boots the order association screen using the client computer of the system for managing to order parts (107). FIG. 3 shows an example of the order association screen. When the user inputs the code in each of the fields 201 for factory code, transaction code 203, transaction number 205 and arrangement code 207 (optional), data base 15 is searched and data including the difference data of the required volume is displayed on the screen as shown in FIG. 3. Transaction code and transaction number are assigned for the transaction of parts order according to the model change from model B to model A. Arrangement code is a code for a vendor to be targeted for the order.

In FIG. 3, if a vendor code is inputted in the field 207 of arrangement code, order data for one of assigned vendors 218 is displayed on the screen. Number of production for the model assigned for the model change is displayed. Code 211 for model A and code 213 for model B are also displayed. Number of production is displayed dividing into two lines every part number 219. The first line shows number of use per a product for the model A and B, which is data read from the part table 15d in FIG. 1. The second line shows the required volume which is derived from multiplying number of use per a product by number 209 of production.

The field 225 in the screen shows number of the order plan. The order plan is a volume which is derived from subtracting the required volume (1) of the part for the model A to be manufactured from the required volume (2) of the part for the model B. Number of the order plan for four parts is displayed in the screen. As to the first part, number of the order plan become 5 (5–0) since the required volume for the model A is five and that for the model B is zero. As to the second part, number of the order plan become minus 5 (0–5) since the required volume for the model A is zero and that for the model B is five. As to the third part, number of the order plan become 5 (10–5) since the required volume for the model A is ten and that for the model B is five. As to the fourth part, number of the order plan become minus 5 (0–5) since the required volume for the model A is zero and that for the model B is five.

The screen in FIG. 3 displays only parts which has the difference of the volume between the two models. All parts for the model A and B are displayed by clicking the button 257 of All/Difference at the top of the screen.

A checkmark is shown in the field 227 for order association when the part that the transaction of the order association has not been completed is selected as a part for new order association. The check mark disappears from the field 227 when the button 261 of single part order is clicked. The filed 229 of classification for pre associated order only displays a word "completed" for parts that the order association have been completed. Once the order association for a part has been completed, the user is not able to do the order association for the part again. The order association means that the user confirms validity of data, inputs correction required and fixes the contents of order regarding the delivery data 231 and the delivery place 233 read from the table of the dependence information 15e which relates to the part table 15d. After the confirmation of data for the parts displayed on the screen, the contents of the order for all parts displayed on the screen is fixed when the button 261 of single part order is clicked.

The button 253 of all list selection at the top of the screen is used for the transaction of the order association for all parts filling all check boxes of the field 227 of order association with checkmarks at the same time. The button 255 of all selection release is used to cancel the transaction of the order association for all parts opening all check boxes of the field 227. The field 215 of package (all) assignment/delivery place is used to assign the delivery places for all parts displayed on the screen in a lump. The same delivery place for all parts is assigned when a delivery place is inputted in the field 215.

The filed 217 of package (all) assignment/deliver date is used to assign the same time and date for delivery of all parts displayed on the screen. The same time and date is assigned in the field 231 of delivery date/delivery time for each part when the button 259 of package transform for delivery time and date is clicked. The field 231 displays time and date read from the table 15e for dependence information in the initial state.

Thus, the order association is fixed by inputting change of delivery time and date when the delivery condition is changed (117 in FIG. 2) or inputting change of delivery place when the place is changed (121).

After the order association has been completed, the management material and the check are issued using the functions of management material issue 29 and check issue 31 which are executed by the system for managing to order parts shown in FIG. 1.

Although the specific embodiments of the invention are described above by way of example, the invention is not limited to the embodiments.

What is claimed is:

1. A computer system for managing orders of parts, the computer system comprising:
 a computer configured to execute the functions comprising:
  identifying a plurality of parts and a volume of each of the plurality of parts necessary to produce a first product model and a second product model, wherein the parts and the volume of each of the parts for the first product model have already been ordered,
  receiving an input of a production change from a first production plan for the first product model to a second production plan for the second product model,
  comparing the parts and the volume of each of the parts which have already been ordered which were identified for the first product model with the parts and the volume of each of the parts which were identified for the second product model, and
  calculating a difference for each part between the volume of each of the parts which have already been ordered which were identified for the first product model and the volume of each of the parts which were identified for the second product model, wherein the calculating is performed responsive to the input of the production change from the first product model to the second product model;
 wherein the computer is further configured to display a plurality of fields, wherein the plurality of fields comprises:
  a field for displaying the identified plurality of parts necessary to produce the first and second product models,
  a field for displaying the identified volume for each of the plurality of parts necessary to produce the first product model,
  a field for displaying the identified volume for each of the plurality of parts necessary to produce the second product model,
  a field for displaying the calculated difference for each part between the volume of each of the parts which have already been ordered which were identified for the first product model and the volume of each of the parts which were identified for the second product model, and
  a field for displaying a transaction status in association with the calculated difference for each part;
 wherein the computer is further configured to switch between a mode for displaying on a display only parts for which the calculated difference equals a negative number to indicate parts that need to be ordered and a mode for displaying all the plurality of parts; and
 wherein the computer is further configured to execute the function of ordering parts for the parts displaying the negative number that the parts already ordered for the first product model prior to receiving the input of the production change are used in the second production plan.

2. The computer system according to claim 1, wherein the computer is further configured to display fields for changeably displaying a planned delivery date, a delivery place and volume of the part relating to a part number of each of the plurality of parts.

3. The computer system according to claim 1, wherein the field for displaying the identified plurality of parts necessary to produce the first and second product models further displays as a table including an index of part numbers.

* * * * *